(12) United States Patent
Christian

(10) Patent No.: US 6,387,212 B1
(45) Date of Patent: May 14, 2002

(54) PROCESS FOR OBTAINING FIBERS INTEGRAL WITH CALCIUM CARBONATE PARTICLES

(75) Inventor: Richard Christian, Chambery (FR)

(73) Assignee: L'Air Liquide Societe Anonyme a Directoire et Conseil de Surveillance pour l'Etude et l'Exploitation des procedes Georges Claude, Paris (FR)

( * ) Notice: Subject to any disclaimer, the term of this patent is extended or adjusted under 35 U.S.C. 154(b) by 0 days.

(21) Appl. No.: 09/601,891

(22) PCT Filed: Feb. 18, 1999

(86) PCT No.: PCT/FR99/00366

§ 371 Date: Aug. 9, 2000

§ 102(e) Date: Aug. 9, 2000

(87) PCT Pub. No.: WO99/42657

PCT Pub. Date: Aug. 26, 1999

(30) Foreign Application Priority Data

Feb. 20, 1998 (FR) .............................................. 98 02096
Feb. 20, 1998 (FR) .............................................. 98 02097

(51) Int. Cl.$^7$ ........................ D21H 17/64; D21H 17/70
(52) U.S. Cl. .......................... 162/9; 162/4; 162/181.2; 162/181.4
(58) Field of Search .................. 162/9, 158, 183, 162/181.1, 181.4, 181.5, 181.2

(56) References Cited

U.S. PATENT DOCUMENTS

| 2,033,452 A | 3/1936 | Schierholtz | 92/40 |
| 2,583,548 A | 1/1952 | Craig | 106/204 |
| 3,833,463 A * | 9/1974 | Croom | 162/29 |
| 4,510,020 A | 4/1985 | Green et al. | |
| 5,096,539 A | 3/1992 | Allan | 162/9 |
| 5,122,230 A | 6/1992 | Nakajima | |
| 5,275,699 A | 1/1994 | Allan et al. | |
| 5,665,205 A | 9/1997 | Srivatsa et al. | |
| 5,679,220 A | 10/1997 | Matthew et al. | 162/181.4 |
| 5,731,080 A | 3/1998 | Cousin et al. | |
| 5,824,364 A | 10/1998 | Cousin et al. | |
| 6,235,150 B1 * | 5/2001 | Middleton et al. | 162/9 |

FOREIGN PATENT DOCUMENTS

| EP | 0 231 762 | 8/1987 |
| EP | 0 737 774 | 10/1996 |
| EP | 0 791 685 A2 | 8/1997 |
| FR | 2 174 945 | 10/1973 |
| WO | WO 90/09483 | 8/1990 |
| WO | WO 97/01670 A1 | 1/1997 |

* cited by examiner

*Primary Examiner*—Dean T. Nguyen
(74) *Attorney, Agent, or Firm*—Burns, Doane, Swecker & Mathis, L.L.P.

(57) ABSTRACT

The invention relates to a process for obtaining fibers integral with calcium carbonate particles, in which the fibers to be treated are contacted with carbon dioxide generator means and at least one composition comprising $Ca^{++}$ ions capable of reacting with the carbon dioxide so as to give "in fine" a precipitation of calcium carbonate "in situ" on the fibers. Preferably, the carbon dioxide generator used is calcium bicarbonate.

20 Claims, 4 Drawing Sheets

PROCESS FOR OBTAINING FIBERS INTEGRAL WITH CALCIUM CARBONATE PARTICLES

BACKGROUND OF THE INVENTION

1. Field of the Invention

The present invention relates to a process for synthesizing calcium carbonate in contact with fibers and to the novel product obtained. It relates more particularly to a process for obtaining fibers integral with calcium carbonate particles, in which the fibers to be treated are contacted with carbon dioxide generator means and at least one composition comprising $Ca^{++}$ ions capable of reacting with the carbon dioxide so as to give "in fine" a precipitation of calcium carbonate "in situ" on the fibers.

The invention likewise relates to a process for removing calcium carbonate from the other insoluble compounds present in various aqueous media, originating in particular from papers for recycling and from deinking sludges.

2. Description of the Related Art

In the various fields concerned with fiber-based products, including the field of paper pulp, it is well known that it is appropriate to provide said products with fillers, generally mineral fillers, in order to impart certain physical properties to said products. Moreover, in view of the high cost of producing and converting said fibers, the fillers act as a less expensive substitute, making it possible to reduce the manufacturing cost of the products containing them.

In particular, in the papermaking sector, in addition to the economies they bring about, the fillers impart numerous qualities to the paper, said qualities including opacity and whiteness, density and porosity, and printability and handle.

The opacity is an essential quality for the paper, especially for papers intended for printing and writing, where it is desirable for the ink to show through as little as possible on the reverse of the sheet. For printing, and other applications, qualities of whiteness are also sought, which are not always exhibited by the fibers alone. In this case, the papermaker adds fillers.

The fillers are, in general, mineral powders; they are added to the fibers before the paper sheet is formed; in this case the reference is to fillers added to the pulp during the manufacture of the fiber suspension which feeds the paper machine (when they are added after the sheet has dried, the reference is to pigments added by coating on the dried paper sheet emerging from the paper machine; the operation is called "coating").

Generally, the fillers are mixed with the fibers during the manufacture of the fiber suspension. Synthetic or natural, they are prepared "ex situ", i.e., they are precipitated or ground, and are sieved before being employed in the paper mill.

The principal natural fillers are kaolin (aluminum silicate), talc (magnesium silicate) and calcium carbonate; the principal synthetic fillers are titanium dioxide, aluminum hydroxide, the mixture of aluminum sulfate plus lime which is called "satin white", and precipitated calcium carbonate.

Recent developments in sizing the paper in an alkaline medium have promoted the use, among these various fillers, of calcium carbonates, both natural and precipitated, the precipitates taking on an increasingly important role by virtue not only of their greater whiteness but also of their morphological characteristics.

The fillers are introduced in variable amount depending on the paper type, on average at between 5 and 35% by weight. There is an economic interest in increasing the filler content when the paper is sold on the basis of its weight, or per sheet: the high cost of the fibers is partially substituted by the low cost of the fillers. However, too high a filler content weakens the mechanical performance of the paper, which leads the manufacturers to use binders and retention aids; other chemical additives are also used, including sizing agents to reduce the sensitivity of the sheet to water and drainage aids to facilitate flow during the forming of the sheet.

Optimizing the proportion of fillers will rest essentially on the form and distribution of the mineral crystals in the fibers. Their purity and their crystallographic characteristics will influence the qualities of the paper.

Paper is therefore a composite material whose manufacture requires a sequence of steps employing a number of technologies for the mixing of raw materials having very different chemical and physical properties, the formation of a wet sheet by removal of water, the drying of the wet sheet, the possible treatment of the surface of the sheet, and the recycling of the various liquors resulting from the process, which are termed "white waters".

Although the principal raw materials are the plant fibers and the fillers, the chemical additives, the majority of which are expensive products, are necessary to the good progress of each step; one objective for the papermaker is therefore to reduce the quantities of said additives.

Incorporating the fillers into the fibers is an essential step of the papermaking process. In the face of the numerous difficulties which are encountered in the realization of this step, a variety of processes and products have been proposed with a view to ameliorating the impact of the fillers both on the papermaking process and on the qualities of the finished product. One of the recommended routes consists in preparing the fillers "in situ", i.e., in the presence of fibers, so as to retain and distribute said fillers more effectively within the fiber mat.

U.S. Pat. No. 2,583,548 thus discloses a process which consists in impregnating cellulose fibers with a solution containing calcium chloride, then in reacting this salt with sodium carbonate in accordance with the double decomposition reaction of two salts:

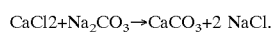

$$CaCl_2 + Na_2CO_3 \rightarrow CaCO_3 + 2\ NaCl.$$

The impregnation of the calcium chloride in the fibers then makes it possible to precipitate the calcium carbonate in the fibers or around the fibers. The sodium chloride, which is a by-product of the reaction, must be removed by washing, which complicates the industrial implementation.

In addition, U.S. Pat. No. 5,096,539 discloses a process which describes, in accordance with this same principle, an "in situ" precipitation of calcium carbonate from calcium chloride, this process introducing a step of washing the fibers before adding the sodium carbonate, in order to remove the calcium chloride situated on the outside of the fibers and to precipitate more specifically the calcium carbonate in the hollow part of the fibers, the lumen. This process, although it enhances the retention and the maintenance of the mechanical properties, by promoting contact between the fibers and therefore the fiber/fiber bonds (since the filler is inside the latter), employs successive washing operations, which limit considerably the industrial scope of the invention.

Moreover, Japanese Application J60-297382 discloses a process for carbonating calcium hydroxide in accordance with the following reaction:

$$Ca(OH)_2 + CO_2 \rightarrow CaCO_3 + H_2O$$

In this process, calcium hydroxide is placed in the presence of fibers. The calcium hydroxide is added in solid form. The fibers are present in the form of a suspension; they are required to exhibit fibrils at their surface in order to permit subsequent retention of the calcium carbonate. The whole batch is mixed with stirring for a period of the order of around ten minutes. The carbon dioxide is then blown in with stirring in order to carbonate the lime. This stirring phase is indispensable; it ensures the uniformity of the reaction and the production of uniform particles of calcium carbonate. The reaction time depends on the proportion of lime added and on the concentration of carbon dioxide; it is generally of the order of 30 minutes. This process, although it has the advantage of not requiring a washing step, remains complex to implement continuously. In particular, during the first step, it is necessary to prepare the milk of lime in contact with the fibers, and especially fibrils, in a relatively concentrated medium, and generally a greater amount by weight of quicklime than of fibers is added. In the second step, which is very intricate to conduct, very considerable and critical stirring is carried out in order that the carbon dioxide injected into the suspension of fibers and slaked lime is able to react with the calcium hydroxide so as to form, subsequently, crystal masses which trap the fibrils. The higher the concentration of the crystals, the better their integration with the fibers.

Also known, from U.S. Pat. No. 5,223,090, applying this same reaction:

$$Ca(OH)_2 + CO_2 \rightarrow CaCO_3 + H_2O. \text{ is}$$

A process for synthesizing $CaCO_3$ "in situ" in contact with cellulosic fibers, in which the calcium is added in the pulverulent state, in the form of CaCO or $Ca(OH)_2$, to hollow fibers containing water on the inside and in the walls. According to this process, the fibers may not in any case be present in the form of an aqueous fiber suspension at the time when the carbon dioxide is added, the latter being required to be added in an amount sufficient to ensure a complete reaction. This step is necessarily carried out in a reactor, under conditions of pressure and stirring which are variable depending on the water content of the fibers. The product thus obtained at the end of this reaction must then be transferred in order to integrate the papermaking process or be used as an additive. According to this process, and in order to facilitate the mixing of the lime and the fibers, it may be preferable to charge the fibers to a water-rich suspension and then centrifuge said suspension in order to remove the water from it before going on to add the carbon dioxide in the pressurized reactor.

Also known, from French Patent Application 2689530, is a process for obtaining "in situ" calcium carbonate-filled fibers, in which, in the same way as for the two abovementioned patents, the application of the reaction scheme involving the two following successive steps is observed: contacting the fibers and the calcium hydroxide, then adding carbon dioxide. The process described in this French patent application possesses the same disadvantages as the process described in Japanese application J60-297382, namely the need to use a large proportion of fillers in order for the calcium carbonate precipitates formed to trap the fibrils, in order to integrate them; the need to provide a suspension containing fibril-rich fibers; and, furthermore, the use of a powerful mixing device in order for the gas injected to react with the calcium hydroxide.

All of the above-described processes further possess the disadvantage of not allowing the fillers to be purified for the purpose of improving the whiteness: in effect, in these processes it is impossible to remove any colored impurities present in the bath, which will therefore come to be deposited on the fiber at the same time as the carbonate and will therefore limit the whiteness of the paper thus obtained.

The processes described above are not directly applicable in the papermaking process because they cannot be integrated into the current manufacturing circuit, either because they necessitate complex washing phases or because they propose intricate chemical reactions of the gas/liquid/solid type in the presence of fibers.

At the present time, therefore, there is no process for preparing calcium carbonate "in situ" which can be integrated simply into the papermaking process, which allows the "in situ" preparation of a precipitated calcium carbonate of high whiteness and well-defined granulometry from any source of calcium carbonate, or which is applicable to a fiber suspension whose dilution is in accordance with that of the suspensions which supply the paper machine.

More generally, there is no process at the present time which makes it possible to remove the calcium carbonate from an aqueous medium and/or to separate this calcium carbonate from other insoluble products in an aqueous medium, in particular the deinking sludges from waste papers or those originating from recycled papers.

SUMMARY OF THE INVENTION

The invention makes it possible to solve, in particular, the problems outlined.

The process of the invention is characterized in that it comprises a step of preparing a first composition comprising calcium bicarbonate, a step of preparing a second composition comprising calcium hydroxide, and a step of mixing the first and second compositions, and the fibers to be treated, so as to give rise to the precipitation of the calcium carbonate in contact with at least some fibers.

Preferably, the calcium bicarbonate present in the first composition is obtained by treating calcium carbonate with carbon dioxide.

In a first variant of the invention, at least some of the $Ca^{++}$ ions originate from a calcium carbonate loaded-liquor.

In another variant of the invention, at least some of the $Ca^{++}$ ions originate from a lime solution.

In order to remove the impurities, the first and/or the second composition are preferably filtered before mixing.

The calcium carbonate used to prepare the first composition of the invention, which may be of any origin, natural calcium carbonate of whatever purity, fine particles present in recovery waters, or of any other origin, is preferably present in the form of an aqueous suspension containing between 0.5 g/l and 10 g/l, preferably between 1.5 g/l and 3 g/l and more particularly 2 g/l.

The carbon dioxide is preferably infected in the form of pure gas or diluted to a total pressure of the order of atmospheric pressure or greater. Preferentially, the second composition of the invention is an aqueous lime suspension, the calcium hydroxide concentration being between 1 g/l and 10 g/l, preferably between 1.5 g/l and 2.5 g/l and more particularly 2 g/l (before filtration). The most judicious concentration corresponds to a concentration which is slightly greater than the solubility limit of calcium hydroxide in aqueous medium under the temperature and pressure conditions employed, such that the lime solution emerging from the preferential subsequent filtration is saturated.

In one variant of the invention, when using a papermaking machine to make paper from fibers, which machine discharges residual liquors referred to as "white waters", the first composition comprises at least a fraction of the "white waters" obtained from the papermaking machine.

In another variant of the invention, when using a papermaking machine to make paper from fibers, which machine discharges residual liquors referred to as "white waters", the second composition comprises at least a fraction of the "white waters" obtained from the papermaking machine.

Preferably, when a papermaking machine is used to make paper from fibers, which machine discharges residual liquors referred to as "white waters", the process of the invention comprises a step of separating the "white waters" into two fractions by filtration, the unfiltered fraction being called "loaded water" and the filtered fraction being called "clear water", a step of using the "loaded water" to prepare the first composition, and a step of using the "clear water" to prepare the second composition. The "loaded water" contains very fine particles of calcium carbonate; adjustment of the required amount of calcium carbonate is carried out by adding calcium carbonate of arbitrary quality. The quality of the calcium hydroxide added to the "clear water" in order to prepare the second composition is likewise arbitrary.

In the process of the invention in which the first composition is a solution of calcium bicarbonate and the second composition is a solution of lime water, it is particularly advantageous to filter said compositions before mixing, in order to remove in particular the colored insoluble residues before the precipitation of the calcium carbonate and to obtain a calcium carbonate with whiteness of at least 95 (in accordance with the ISO brightness).

The process, according to the invention, is applicable to any type of fibers used in papermaking, irrespective of their nature and their degree of beating.

Preferably, the fibers to be treated will be present in the form of a fiber suspension in water, containing between 1 to 15% by weight of fibers and, more preferably, between 5 and 10% by weight of fibers.

The novel complex product, according to the invention, contains fibers and fillers which are crystallized on their contact and is characterized in that the calcium carbonate crystals are fixed on the surface of the fibers; they are unitary and distributed evenly over the totality of the surface of the fibers, and not agglomerated or clustered together; they are regular and of a size between 0.5 and 5 $\mu$m.

In one variant of the invention, the novel complex product is characterized in that its calcium carbonate Content is between 2 and 50% by weight relative to the total solids content and preferably between 2 and 30%.

In accordance With another aspect, the process according to the invention which relates to a process for removing calcium carbonate from the other insolubles present in various aqueous media and originating in particular from papers for recycling and from deinking sludges is characterized in that it comprises a step of injecting $CO_2$ into the medium to be treated, a step of solubilizing sodium carbonate into bicarbonate, and a step of separating the resulting calcium bicarbonate by filtration from the medium after reaction.

Preferably, the resulting calcium bicarbonate is treated to give calcium carbonate.

Preferably, the solution containing the calcium bicarbonate is contacted with a solution of calcium hydroxide to give calcium carbonate.

Advantageously, the solution of calcium hydroxide is filtered beforehand in order to remove the insoluble impurities.

In one variant of the invention, the step of forming calcium carbonate is carried out in the presence of fibers in order to produce a precipitate of calcium carbonate "in situ" on the fibers.

In another variant of the invention, inert solid particles are added to one of the solutions after filtration and before mixing as a calcium carbonate seed growth initiator.

In another variant of the invention, the calcium carbonate is precipitated "ex situ" in the absence of a support.

The invention will be better understood with the aid of the following, nonlimiting embodiment examples, together with the figures, which show the following:

Figure 1:
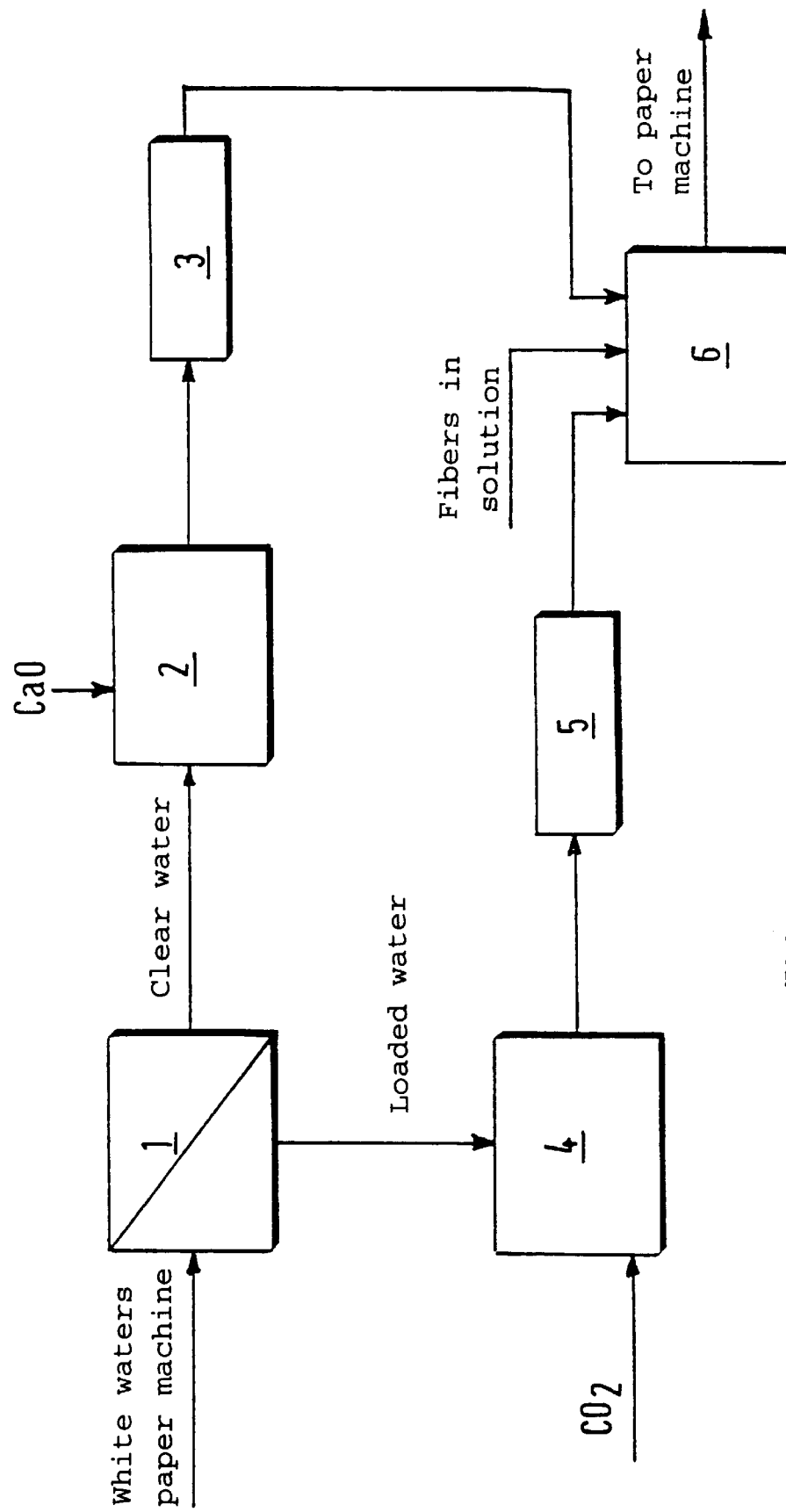
FIG. 1 is a diagram of the process of synthesizing calcium carbonate in contact with fibers in the papermaking process.

The process for synthesizing calcium carbonate in contact with fibers in the papermaking process, in accordance with the process of the invention, is shown diagrammatically in FIG. 1.

The "white waters" are separated into two fractions by filtration in the separator (1); the filtered portion, free of calcium carbonate, forms the "clear water"; the unfiltered portion, enriched in calcium carbonate, forms the "loaded water".

The "clear water" is used to prepare a milk of lime. For this purpose, it passes into the calcium hydroxide mixer (2) in which the lime is added. The quality of the lime added is arbitrary: quicklime, slaked lime, lime furnace residues, or residues from waste paper incinerators, for example. The amount of lime is determined such that the milk of lime preferably has a concentration which is slightly greater than the solubility limit of calcium hydroxide under the operating conditions. The milk of lime is filtered in the lime water filter (3) in order to remove the impurities originating from the lime added and the residual impurities possibly originating from the recycled waters.

The calcium carbonate-loaded water is adjusted in concentration in the carbonator (4) by adding calcium carbonate of arbitrary quality. It is treated with gaseous $CO_2$ in order to convert the insoluble calcium carbonate into calcium bicarbonate, whose solubility is greater, in accordance with the well-known reaction:

$$CaCO3+CO_2 \text{ gas}+H_2O \rightarrow Ca(HCO_3)2$$

In this way a saturated solution of (soluble) calcium bicarbonate is prepared, containing from 1 to more than 3 g/l of $Ca(HCO_3)2$. The solution obtained is filtered in the bicarbonate filter (5) in order to remove the insoluble impurities, originating both from the recycled waters and from the added calcium carbonate, thereby eliminating in particular the colored insoluble residues.

In accordance with another aspect of the invention, a pure or substantially pure calcium carbonate is prepared by converting the insoluble calcium carbonate present in an arbitrary recovery solution into soluble calcium bicarbonate, then separating on the one hand the particles and on the other the aqueous solution containing the bicarbonate, which may be subsequently precipitated either on the fibers or "ex situ". This method of obtaining calcium carbonate therefore makes it possible to recover the calcium carbonate present in various aqueous media connected (or unconnected) with papermaking, originating in particular from papers for recycling and from deinking sludges. In this specific embodiment of the invention, the aqueous medium containing calcium carbonate among other insoluble compounds is treated with $CO_2$ and then filtered. The aqueous phase containing the calcium bicarbonate may be treated to give calcium carbonate, which will be added to the separator (1) or may be used otherwise and in the context of the invention; the aqueous phase containing the calcium bicarbonate may also, following adjustment of the concentrations, be added directly to the crystallization tank (6) or may be used elsewhere and in the context of the invention.

The filtrations thus carried out on the solutions containing calcium ions will make it possible to obtain, subsequently, calcium carbonate crystals of high whiteness.

The fibers to which the process is applied originate from the paper machine upstream of the process; here, they are present in the form of an aqueous suspension; they are beaten depending on the required final characteristics of the paper. The invention is applicable whatever the degree of beating.

The solutions containing the calcium bicarbonate, the calcium hydroxide, and the fiber suspension are subsequently mixed in the crystallization tank (6), continuously or batchwise depending on the requirements and facilities of the production process. The mixing speed and mixing time will be varied so as to optimize the crystallographic forms.

The crystallizaton of the calcium carbonate is then carried out on the fibers, in accordance with the following reaction scheme:

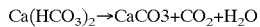

since the PH is less than 8, the $CO_2$ liberated during the reaction is immediately consumed, wherever it appears, by the calcium hydroxide, according to the reaction:

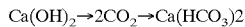

or:

The advantage of the product obtained in accordance with the invention, in addition to the qualities of whiteness which result from the purifications by filtration, is measured by the proportions of crystals which become fixed in contact with the fibers and by the morphological characteristics of the crystals thus formed (and described hereinbelow).

EXAMPLE 1

The following example permits better illustration of the invention.

Three solutions are prepared:
Aqueous solution A=120 g containing 9.60 grams of plant fibers, or 80 g/l.
Aqueous solution B=970 g containing 1.60 grams of $Ca(OH)_2$, or 1.60 g/l.
Aqueous solution C=1600 g containing 3.5 grams of $Ca(HCO_3)_2$, or 2.2 g/l.

Solution B is prepared in a beaker containing 2000 g of water. 6 g of quicklime, CaO, is added. The mixture is stirred at room temperature for ten minutes. The solution is filtered in order to remove the residual products in suspension and, by dilution, the concentration is adjusted to 1.6 g/l of $Ca(OH)_2$. 970 g of this solution are taken.

Solution C is prepared in a reactor containing 2000 g of water at room temperature and equipped with an auto-suction turbine. 6 g of $CaCO_3$ ground to 10 μm are added and, after the reactor has been closed, $CO_2$ gas is injected under a pressure of 3 bars and this pressure is maintained for 5 minutes. Subsequently, following decompression and slight vacuum in order to remove the dissolved $CO_2$, this solution is filtered in order to remove the residual products in suspension and, by dilution, the concentration is adjusted to 2.2 g/l of $Ca(HCO_3)_2$. 1600 g of this solution are taken.

A+B+C are mixed in a vessel with stirring. No other additive is added.

A sufficient amount of suspension is taken in order to prepare a paper specimen in accordance with the procedure which is well known to the skilled worker.

After drying, the paper specimen is recovered and the calcium carbonate attached to the fibers is measured relative to the amount of calcium carbonate precipitated during the mixing of solutions B and C.

The proportion of calcium carbonate fixed to the fibers is 60%. The specimen contains 20.2% by weight of calcium carbonate.

Figure 2:
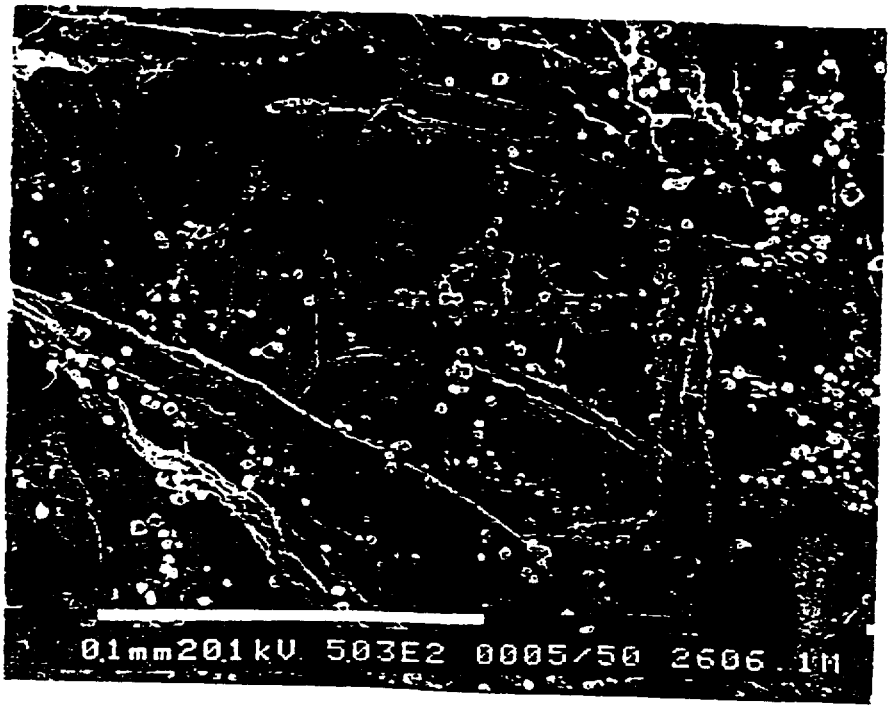
FIGS. 2 to 4 are scanning electron micrographs (SEM) of the novel product of the invention.

FIG. 2, taken with a scanning electron microscope at a magnification of 503, shows that the novel product according to the invention is present in the form of a fibrous structure composed of elementary fibers bearing crystals of calcium carbonate distributed uniformly throughout the product, without the formation of agglomerates or clusters.

Figure 3:
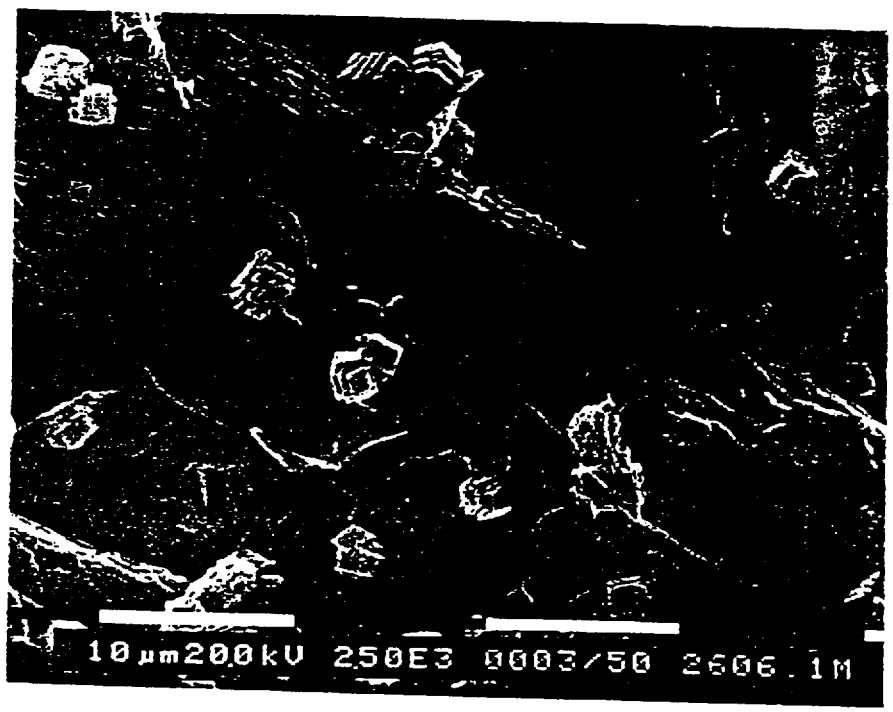

FIG. 3, taken with a magnification of 2500, shows that these crystals are unitary and are fixed to the fibers. Their size is regular, of the order of approximately 3 μm.

Figure 4:

FIG. 4, taken with a magnification of 10,000, illustrates the growth of the crystals. In this case, these crystals are of rhombohedral structure.

EXAMPLE 2

Comparative Example

This example was carried out with a commercial calcium carbonate referred to as "precipitated", from SOLVAY, product 92 E. In this second example, the filler is simply mixed with the fibers in accordance with the conventional route well known to the skilled worker.

Aqueous solution A=120 g containing 9.6 grams of plant fibers, or 80 g/l.

Aqueous solution B=2570 g containing 4.30 grams of carbonate 92 E, or 1.70 g/l.

A+B are mixed in the same way as in Example 1 and a paper specimen is manufactured under the same conditions.

The paper specimen is recovered after drying and the calcium carbonate retained by the fibers is measured relative to the amount of calcium carbonate precipitated from solution B.

The proportion of calcium carbonate retained by the fibers is 15%, without chemical additive. The specimen contains only 6% by weight of calcium carbonate.

Figure 5:
FIGS. 5 to 7 are scanning electron micrographs of a control product.

FIG. 5, taken with a scanning electron microscope at a magnification of 503, shows that the control product is present in the form of a fibrous structure composed of elementary fibers which carry agglomerates of calcium carbonate crystals distributed irregularly throughout the product.

Figure 6:

FIG. 6, taken with a magnification of 2500, shows that the crystals are agglomerated, and irregular in size.

Figure 7:
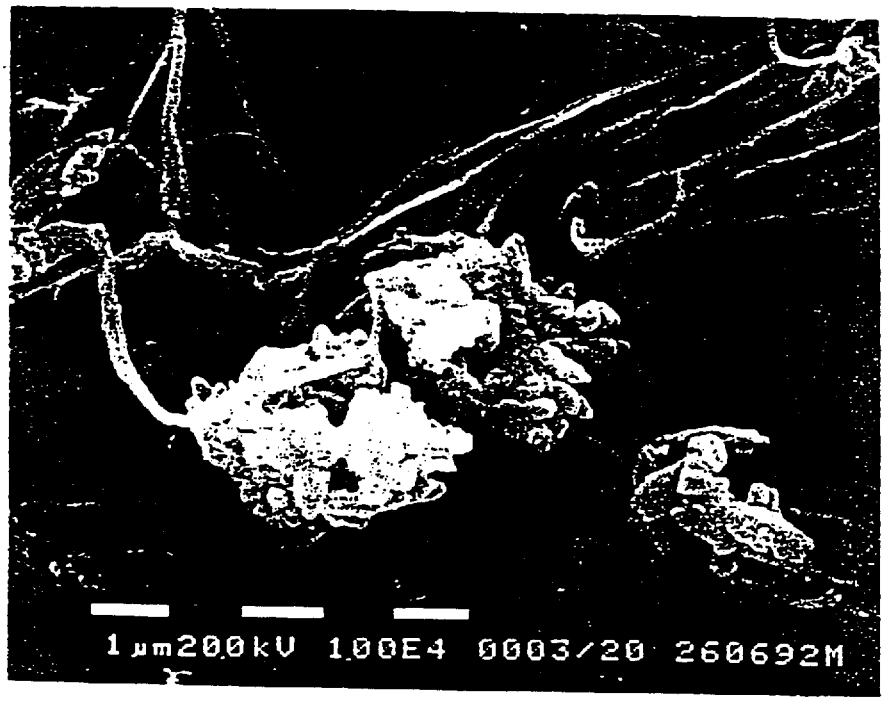

FIG. 7, taken with a magnification of 10,000, shows that the highly agglomerated crystals trap the fibrils. In this case, the crystals are of scalenohedral structure.

These examples illustrate the advantage of the bicarbonate route in accordance with the invention relative to the conventional route:

The degree of fixation of the calcium carbonate on the fibers is greater when the bicarbonate route is adopted.

The crystals are unitary, fixed to the wall of the fibers, and not clustered or agglomerated.

The crystals exhibit a fairly planar form. They are uniform in size. This size varies between 0.1 and 10 $\mu$m and, preferably, between 0.5 and 5 $\mu$m depending, primarily, on the mixing speed, but also on the concentration of the solutions and on the temperature. The crystals are smaller when the mixing speed or the temperature are greater or when the amount of calcium carbonate is small.

Without wishing to be bound by any one theory, the Applicant thinks that, in contradistinction to what takes place in the case of an "in situ" precipitation from calcium hydroxide alone, in the process according to the invention the following is observed: starting from calcium bicarbonate to make the carbonate, the reaction takes place within microdomains in which the ph is acidic (approximately 6 at the start of the reaction) and in contact with the fibers. Crystals of calcium carbonate grow from seeds which are present on and inside the fibers. This hypothesis is supported by the fact that the calcium carbonate crystals according to the invention are present in the form of flat crystals, which are characteristic of a crystal obtained from a supersaturated solution by crystalline growth.

On the contrary, in the case of a precipitation of calcium carbonate from $Ca(OH)_2$, the reaction takes place in basic medium and precipitation on the fibers by mechanical and not chemical bonding is observed, i.e., by agglomeration of smaller unitary crystals, as described in French Patent Application 2689530, and not by crystalline growth.

This structural difference of the product may explain the better retention of the fillers in the fibers.

The process, according to the invention, is applicable to any pulp of mechanical or chemical origin, irrespective of its degree of beating. It may also be applied to (totally or partially) recycled pulps: the fibers or fiber mixture, recycled or otherwise, must be dissolved in the manner described hereinabove in order to be introduced into the crystallization tank (6).

Regarding the aspect of the invention relating to the removal of the calcium carbonate or to the separation thereof from the other insolubles, this is evident from the examples hereinbelow:

The calcium carbonate present in the deinking sludges or other sludges is converted to calcium bicarbonate in accordance with the process described hereinabove. Since the bicarbonate is soluble, the solution need only be filtered to give, on the one hand, water containing the bicarbonate dissolved therein and, on the other, all of the insolubles retained in the filter. This makes it possible to recover the carbonate by reprecipitating it and/or to recover the sludges without calcium carbonate, depending on the use to which the invention is to be put.

What is claimed is:

1. Process for obtaining fibers integral with calcium carbonate particles, which comprises:

preparing a first composition comprising calcium bicarbonate;

preparing a second composition comprising calcium hydroxide; and mixing the first and second compositions in the presence of said fibers thereby precipitating calcium carbonate particles in contact with at least some of said fibers.

2. Process according to claim 1, wherein the calcium bicarbonate present in the first composition is obtained by treating calcium carbonate with carbon dioxide.

3. Process according to claim 2, wherein the calcium carbonate is present in the form of an aqueous suspension containing between 0.5 g/l and 10 g/l.

4. A process according to claim 3, wherein the calcium carbonate is present in an amount of 1.5 to 3 g/l.

5. A process according to claim 4, wherein the calcium carbonate is present in an amount of 2 g/l.

6. Process according to claim 2, wherein the carbon dioxide is injected in the form of pure gas or diluted to a total pressure of at least atmospheric pressure.

7. Process according to claim 1, wherein at least some $Ca^{++}$ ions present in the first composition originate from a calcium carbonate-loaded liquor.

8. Process according to claim 1, wherein at least some $Ca^{++}$ ions present in the second composition originate from a lime solution.

9. Process according to claim 1, wherein the first composition is filtered before mixing with the second composition.

10. Process according to claim 1, wherein the second composition is filtered before mixing with the first composition.

11. Process according to claim 1, wherein the second composition is an aqueous lime suspension, the calcium hydroxide concentration being between 1 g/l and 10 g/l.

12. A process according to claim 11, wherein the calcium hydroxide is in a concentration of 1.5 to 2.5 g/l.

13. A process according to claim 12, wherein the calcium hydroxide is in a concentration of 2 g/l.

14. Process according to claim 1, wherein the calcium bicarbonate present in the first composition is prepared by treating an aqueous medium containing calcium carbonate obtained from paper recycling or from deinking sludges, with carbon dioxide.

15. Process according to claim 1, wherein at least a portion of the first composition comprises residual liquors obtained from a papermaking machine.

16. Process according to claim 1, wherein at least a portion of the second composition comprises residual liquors obtained from a papermaking machine.

17. Process according to claim 1, wherein residual liquors obtained from a papermaking machine are separated into an unfiltered fraction and a filtered fraction with the unfiltered fraction being used to prepare the first composition and the filtered fraction used to prepare the second composition.

18. Process according to claim 1, in which the first composition is a solution of calcium bicarbonate and the second composition is a solution of lime water, wherein said compositions are filtered before mixing to remove colored insoluble residues before the precipitation of the calcium carbonate and to obtain a calcium carbonate with a whiteness of at least 95.

19. Process according to claim 1, wherein the fibers to be treated are present in the form of a fiber suspension in water containing between 1 to 15% of fibers by weight.

20. A process according to claim 19, wherein the fibers are present in an amount of 5 to 10% by weight.

* * * * *